April 2, 1968 D. M. PHILLIPS 3,375,620
TERMINAL PEDESTAL FOR UNDERGROUND WIRING SYSTEMS
Filed July 15, 1965 4 Sheets-Sheet 2

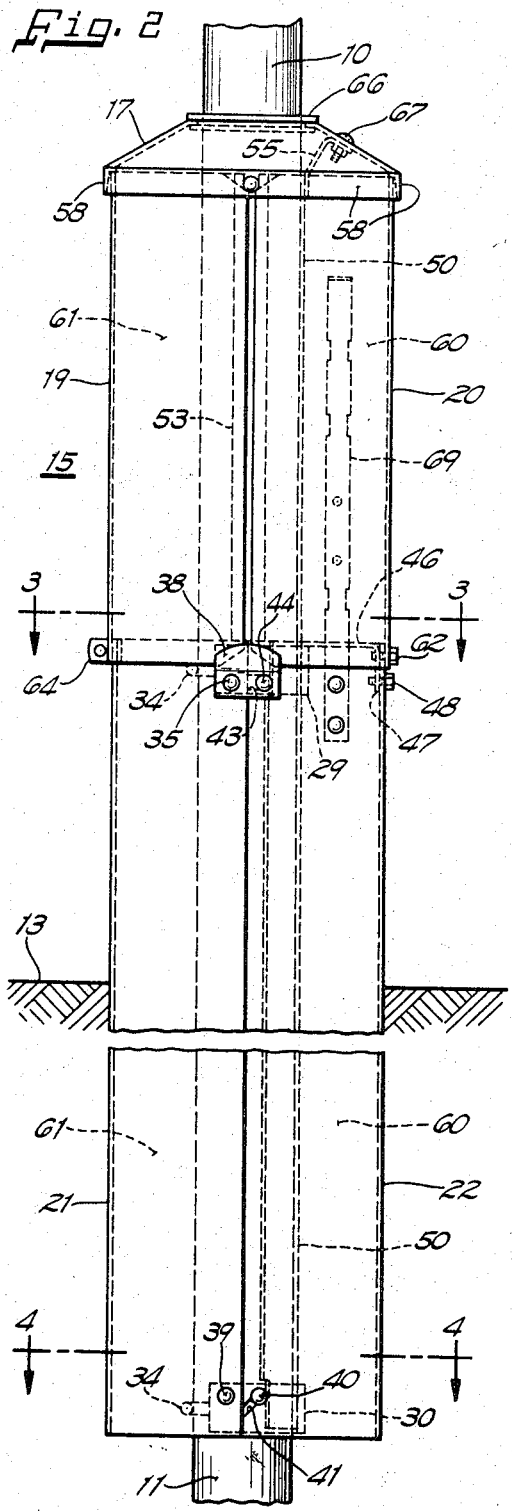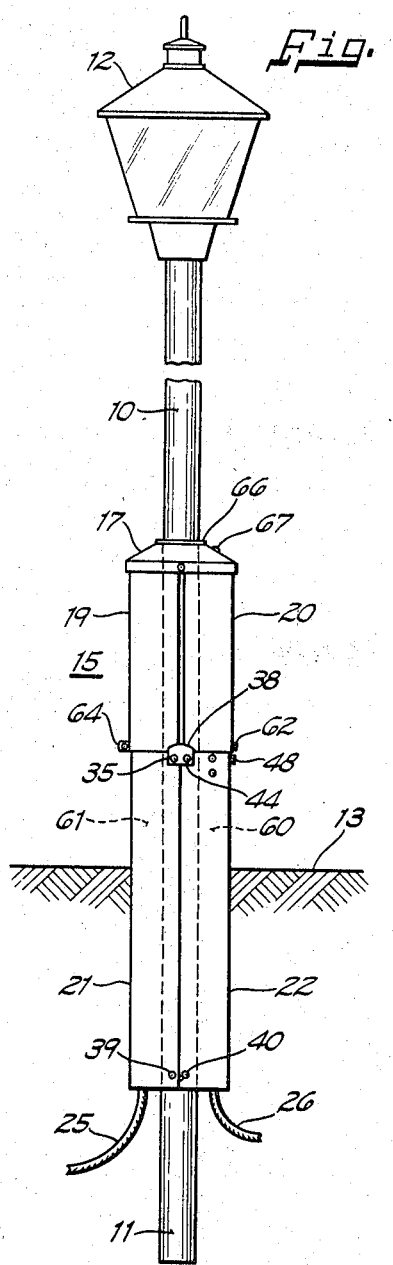
INVENTOR.
Davis M. Phillips
BY Robert W. Lahtinen
Attorney

INVENTOR.
Davis M. Phillips
BY
Robert W. Lahtinen
Attorney

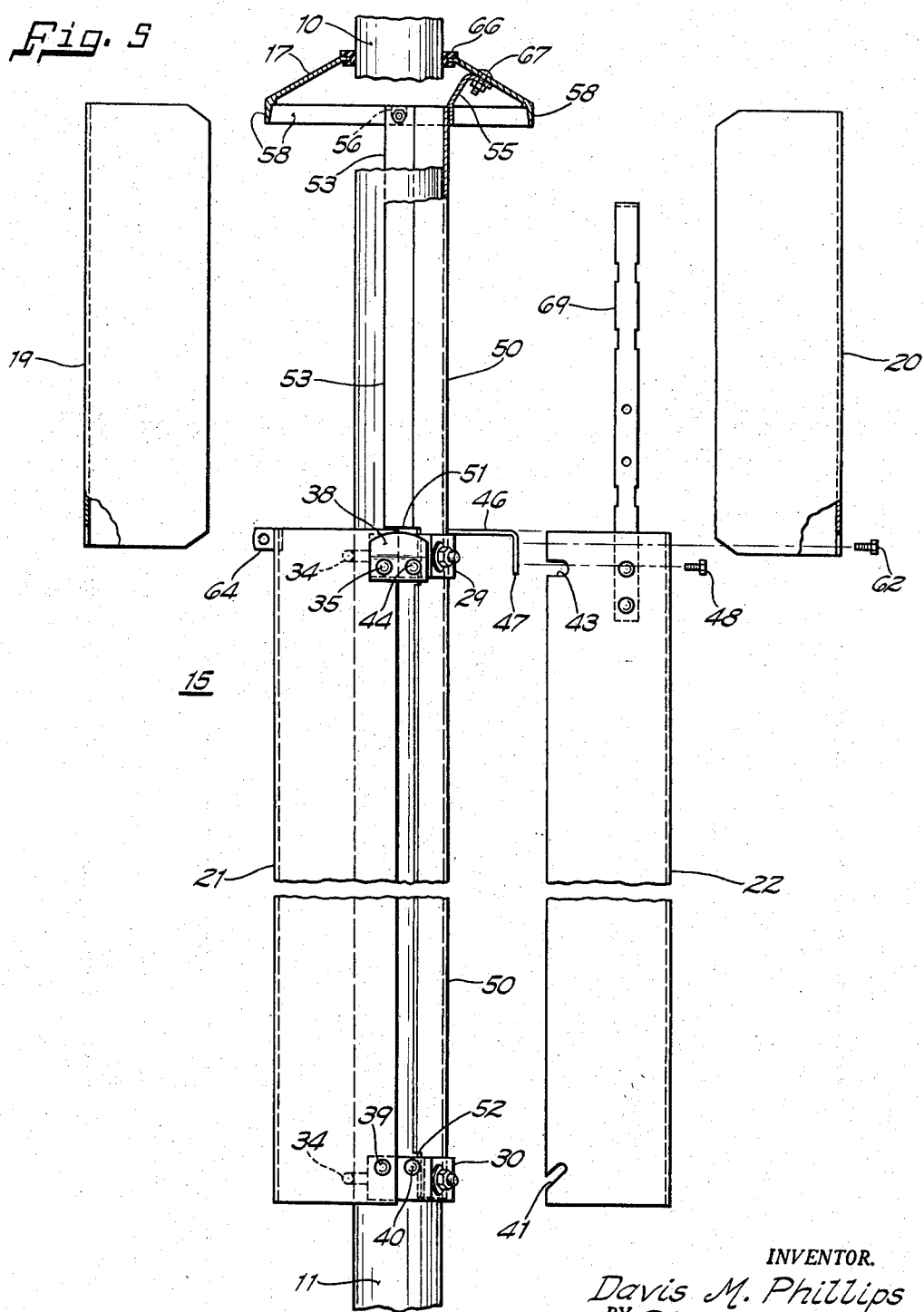

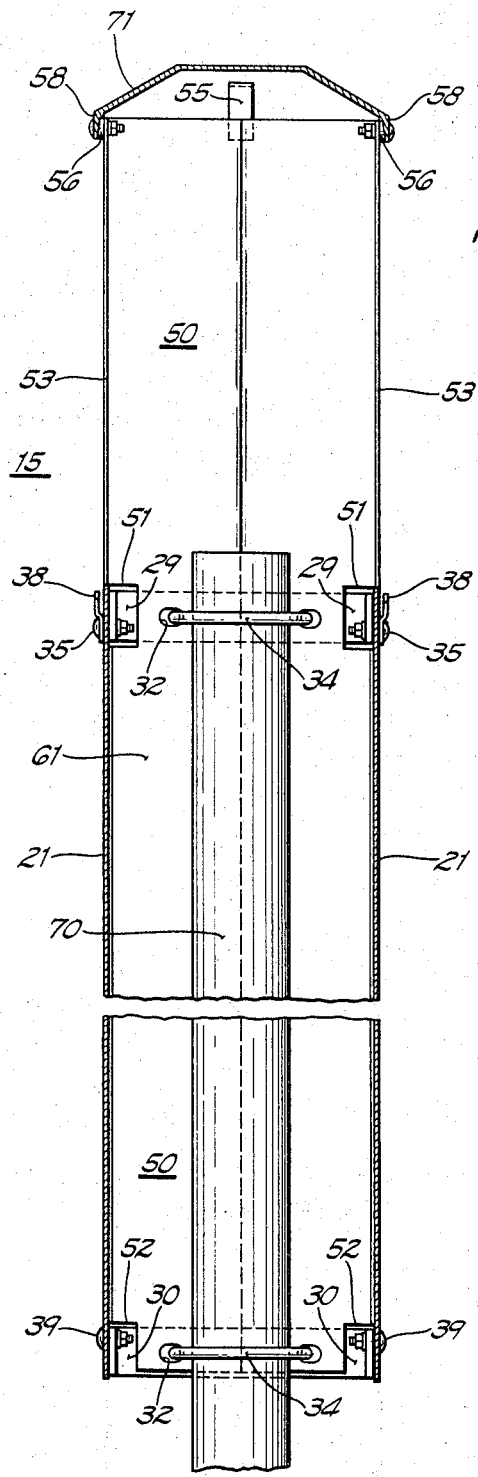

United States Patent Office 3,375,620
Patented Apr. 2, 1968

3,375,620
TERMINAL PEDESTAL FOR UNDERGROUND WIRING SYSTEMS
Davis M. Phillips, South Milwaukee, Wis., assignor to McGraw-Edison Company, Milwaukee, Wis., a corporation of Delaware
Filed July 15, 1965, Ser. No. 472,256
7 Claims. (Cl. 52—28)

ABSTRACT OF THE DISCLOSURE

A pole assembly for supporting a luminaire at its upper end and a terminal enclosure at its lower end. The terminal enclosure includes a pair of channel-shaped ground line covers extending below ground level and which are a barrier wall extending the vertical length of the enclosure and secured to each other and to the pole by a bracket assembly. A pair of channel-shaped access covers and a cap are provided at the upper end of the enclosure with the edges of all of the enclosure members coacting to form a continuous outer housing.

Background of the invention

This invention relates to a terminal connecting pedestal for buried wiring systems and, more particularly, to a dual purpose pedestal providing an above ground assembly for connecting and splicing conductors of two services as, for example, power transmission and telephone cables.

Improved materials that extend the life of conductor insulations and the development of better methods of burying conductors have given rise to extended use of underground systems which, although more costly, have definite advantages in maintenance, safety, resistance to storm damage and improved appearance.

In areas where it is elected to use underground systems, material savings can be realized in cost of burying conductors and providing termination facilities if common trenches and termination equipment can be utilized. Further, since a principal feature of the underground system is the elimination of visible equipment, it is desirable not to replace poles and overhead wires with a maze of ground level equipment enclosures and termination housings that must be camouflaged or otherwise rendered more aesthetically acceptable.

To minimize the number of termination accommodating pedestal units required, it is increasingly becoming the practice of telephone and power utilities to utilize common enclosures. In reaching an accord for common use, it is necessary that the requirements of both utilities be satisfied which necessitates separate compartments within the enclosure. One reason for this is that the power company will want to deny access of the power compartment to others by locking the enclosure whereas telephone utility policy is usually to securely fasten the enclosure access cover, but not provide a lock.

The applicant, in the present invention, has provided a joint use pedestal for serving the termination requirements of two utilities while commonly disposing the pedestal as the base portion of a lighting pole. The pedestal is disposed about and uses a pole member as a support stake embedded in the ground. The enclosure, having underground portions rigidly connected to the pole which engage the ground further from the pole axis than the pole itself, serves to stabilize and further support the pole in addition to receiving support from the pole.

Although the pole may be used solely as a stake member for the pedestal, the common practice is to utilize the pole which supports the street lighting luminaire. In this way, only infrequently are additional free-standing pieces of equipment required for making the above ground connections.

Since the entire system is composed of a luminaire supporting pole, a luminaire supporting pole with a pedestal enclosure about the base or a pedestal using a shortened pole as the stake, a minimum number of different parts form the system. This is particularly true since the combined pedestal and pole requires no operations on the pole and, accordingly, the luminaire supporting pole is the same whether used alone or with the pedestal enclosure.

It is an object of this invention to provide an improved joint use pedestal for underground services.

It is a further object of this invention to combine a joint use pedestal with a lighting pole to minimize the required number of pieces of above ground equipment in an underground distribution system and realize benefits of mutual support between the pole and the pedestal.

It is also an object of this invention to provide a joint use dual compartment pedestal about the base of the pole such that the pedestal and pole mutually provide support for one another to enhance the stability in the composite structure.

Brief description of the drawings

FIGURE 1 is an elevation partially broken away of the combination illuminating pole and terminal pedestal of this invention;

FIGURE 2 is an enlarged elevation view of the pedestal portion of FIGURE 1 partly broken way with interior portions shown in phantom view;

FIGURE 5 is an exploded view partially broken away and partially in section of the pedestal of FIGURE 2; and FIGURE 6 is a vertical section with portions removed of a pedestal of an alternative embodiment of this invention where a pole is used solely as a supporting stake for the pedestal.

Preferred embodiments of the invention

Figure 3:
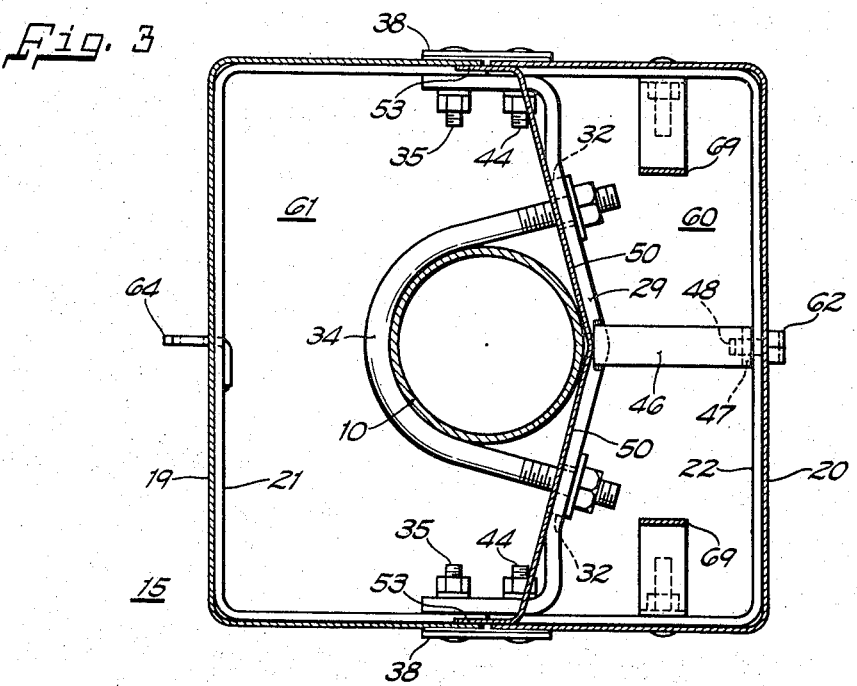
FIGURE 3 is a section view taken along line 3—3 of FIGURE 2.

Referring to the drawings, FIGURE 1 shows a pole 10 having a lower portion 11 embedded in the ground and a luminaire 12 supported about the upper end. Surrounding the base of the pole at the ground line 13 is a pedestal housing 15 with an apertured cap 17 through which the pole 10 extends. A pair of removable access covers 19, 20 and a pair of ground line covers 21, 22 with the lower portions embedded in the ground and the upper ends extending to the access covers, cooperate with pole 10 and cap 17 to provide an uninterrupted enclosure above ground line 13. The lower end of the pedestal enclosure below the ground line is open to permit the entry of utility cables or conductors 25, 26 from a random lay underground cable system.

Figure 4:
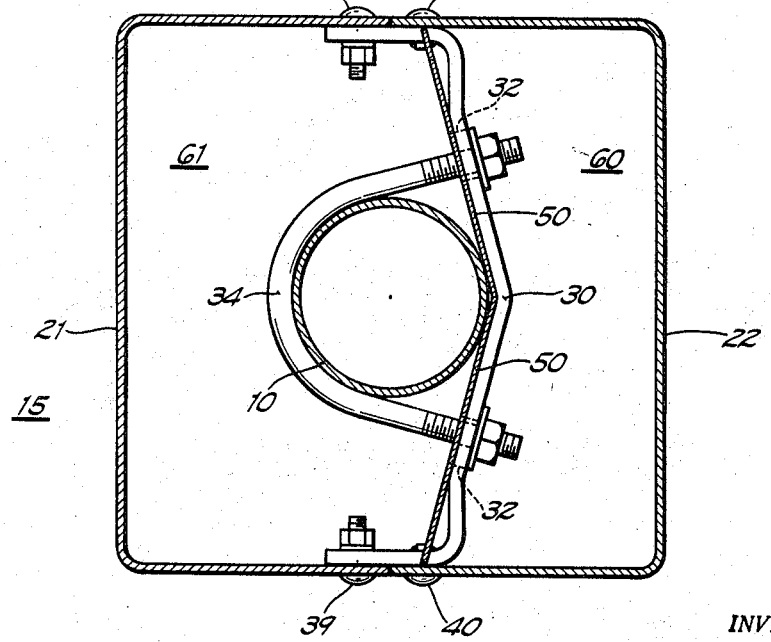
FIGURE 4 is a section view taken along line 4—4 of FIGURE 2.

With reference to FIGURES 2 through 5, the pedestal 15 includes upper and lower generally U-shaped bracket members 29 and 30 respectively. Each of the brackets 29, 30 has a pair of elongated spaced apertures 32 adapted to receive the diverging legs of a U-bolt 34. Ground line covers 21 and 22 are secured to the legs of the brackets 29 and 30. The upper end of ground line cover 21 is secured to bracket 29 by a pair of bolts 35 which each also pass through and retain a locking clip 38. At the lower end, cover 21 is secured to the bracket 30 by bolts 39. The ground line cover 22 is retained at the bottom by a pair of rivets 40 which are secured to bracket 30 and receive the downwardly inclined open-ended slot 41 about the shank portion thereof. With the lower slot engaging the rivet 40, the top portion is pivoted to a vertical position wherein the upper slots 43 are received about bolts 44. An L-shaped bracket 46 has one leg welded to the upper bracket 29 and a vertical portion 47 which receives a bolt 48 that extends through the wall of cover 22 into a threaded aperture to retain the cover in the assembled position as shown in FIGURE 2. The bolts 44 are thereupon tightened to securely position the cover 22 in the assembled condition.

A vertically extending central barrier wall 50 extends vertically within the pedestal enclosure from the cap 17 to substantially the bottom of the pedestal to divide the enclosure into two vertically extending compartments. The partition or barrier 50 throughout the height that it is coextensive with the ground line covers 21, 22 has marginal edges that are in substantially abutting relation with the interior surfaces of the flange portion of ground line cover 22 (FIGURE 4), except for two relieved portions 51, 52 along each edge to avoid interference with the legs of brackets 29 and 30. From the top of the ground line covers 21, 22 to the cap 17, the barrier 50 is provided with marginal flanges 53 at each side which have the outer surfaces of each aligned with the outer surfaces of the adjoining ground line cover. Also forming a part of the barrier structure is a bracket support strap 55 welded to an upper portion. The cap 17 is bolted to the barrier flanges 53 at either side through bosses 56 which space the flanges and the downwardly depending peripheral wall portion 58 of cap 17 to permit subsequent assembly of the access covers 19 and 20 between the barrier flange 53 and the cap peripheral wall 58. Bolting the barrier support strap 55 to the cap 17 positively aligns the cap and barrier wall 50.

The barrier wall 50 is provided with upper and lower pairs of elongated apertures through which the diverging legs of U-bolts 34 are received and extend in the assembled condition to retain the barrier wall captive between the brackets 29 and 30 and the pole 10.

The access covers 19 and 20 are of generally U-shaped construction and each is received over the barrier flanges 53 and upper exterior marginal surfaces of the adjacent ground line cover 21 and 22 respectively in closely telescoped relation. The upper marginal edge of each of the access covers 19 and 20 is telescoped under the peripheral wall portion 58 of the cap 17 and a lower portion is retained at each side between the locking clip 38 and the adjacent ground line cover.

The vertically extending terminal compartment 60 is provided in the example of the illustrated embodiment for telephone terminals and the access cover 22 is accordingly retained by a bolt 62. Terminal compartment 61, as illustrated, is provided for power terminals and, accordingly, a padlock bail 64 is welded to the interior surface of the cover 21 and passes through a slotted opening in the cover to be received in a slot in the lower margin of the access cover 19 enabling the cover to be locked in position for safety.

The pole 10 passes through a rubber grommet 66 to afford a seal between the pole and the wall defining the cap aperture. Suitable sealing means are also provided with respect to bolt 67 to assure the moisture tight integrity of the cap portion overlying the telephone terminal compartment 60.

It will be noted that the confronting vertical marginal edges of the ground line covers 21 and 22 are in closely abutting relation. The access covers 19 and 20 have a small but definite clearance between the confronting flange wall edges to make them readily assemblable and removable. There are no junctions between the enclosure part in the area of the access covers which are achieved by the abutting relation of adjoining parts. Each juncture is effected by telescoping one wall portion closely over another since this affords extra safety in the region where conductor termination might present uninsulated portions which could create a hazard. As an example of a terminal mounting support, bracket 69 is shown in the telephone compartment secured to ground line cover 22.

Installation of the combined joint pedestal and pole is effected by securing the U-bolts 34 through the brackets 29, 30 and barrier 50 about the pole 10 at the ground line cover 21 secured to the brackets 29 and 30 and the cap 17 in position. The pole and pedestal thus partially assembled are then partially imbedded in the ground and the electrical cables brought into the compartment 61. The telephone cables are thereafter brought into the telephone compartment, the ground line cover 22 installed and the burial of the lower portion of the pedestal completed.

The pole 10 extends substantially further below the ground line 13 than does the lowermost pedestal portion to provide the supporting stake structure while the peripheral walls of the pedestal are disposed a substantially greater distance from the vertical axis of the combined unit than the pole wall portion to afford a stabilizing structure.

FIGURE 6 shows an alternative embodiment of the invention with the access covers removed and the cap and ground line cover in section. In this embodiment, a shortened pole 70 is used which serves only as a stake member to provide support for the pedestal assembly, terminating just above the upper bracket 29. The cap 71 is also modified to eliminate the aperture of cap 17 as shown in FIGURES 1 through 5.

Although specific embodiments have been shown and described, it will be apparent to those skilled in the art that various changes and modifications may be made therein without departing from the spirit of the invention or from the scope of the appended claims.

What is claimed is:

1. In combination with a stake member, a terminal enclosure comprising a barrier wall assembly vertically extending within said enclosure to divide said enclosure into two compartments; a pair of generally U-shaped ground line cover members having abutting flange edge surfaces disposed in surrounding relation to said stake with the lower ends below said ground line and the upper ends above said ground line, means for securing said ground line covers to said barrier wall assembly; a cap member having a downwardly extending marginal flange and secured to said barrier wall assembly, said barrier wall assembly presenting horizontally spaced vertically extending parallel wall portions extending between said ground line cover and said cap member; a pair of generally U-shaped access covers having marginal flange wall portions in confronting relation to one another surrounding said stake and telescoped over said barrier wall parallel wall portions, said access covers having upper marginal wall portions telescoped beneath said cap member marginal flange and lower marginal wall portions overlying said ground line cover to form an uninterrupted enclosure wall above said ground line.

2. In combination, a pole having the lower end portion thereof imbedded in the ground, a luminaire carried by said pole at the upper end thereof; a terminal enclosure having an apertured upper cover surrounding said pole and a lower end portion imbedded in the ground to present an uninterrupted outer wall portion above the ground line comprising a pair of generally U-shaped ground line covers with mutually abutting flange edge surfaces in surrounding relation to said pole with the lower ends thereof below the ground line and the upper ends above the ground line; a pair of vertically spaced brackets secured to said ground line covers to retain said ground line covers with respect to one another; a vertically extending barrier member dividing said enclosure into two compartments and presenting horizontally spaced vertically extending parallel wall portions; clamp means connected to each of said brackets to secure said brackets to said pole with said barrier member positioned and retained captive therebetween and a pair of generally U-shaped access covers with confronting flange edge portions telescoped over said barrier member parallel wall portions.

3. In combination with a pole having the lower end thereof imbedded in the ground, an enclosure about the base of pole and presenting uninterrupted wall portions above the ground line with a conductor receiving opening below the ground line and comprising a pair of generally U-shaped ground line covers provided with abutting flange edge surfaces; a pair of vertically spaced brackets securing said ground line covers to one another in surrounding relation to said pole; a vertically extending barrier wall within and vertically dividing said enclosure into two compartments; securing means within said enclosure for releasably connecting said brackets to said barrier wall and said barrier wall to said pole, said barrier wall having vertically extending horizontally spaced parallel flange portions extending upwardly from said ground line covers, a pair of U-shaped access covers extending outwardly from said ground line covers with marginal flange portions thereof telescoped over said barrier wall flange portions.

4. In combination with a pole having the lower end thereof imbedded in the ground, a dual compartment terminal pedestal comprising a vertically extending partition member having parallel flange portions along the vertical margins; attachment means for securing said partition to said pole, a pair of channel-shaped ground line covers each having vertically extending marginal flange portions secured with the marginal edge surfaces of the flange portions in abutting relation to form a wall surrounding said pole, said ground line covers having a lower portion below said ground line and an upper portion extending above said ground line; a cap member supported at the upper end of said partition and vertically spaced from the upper ends of said pair of ground line covers; and a pair of channel-shaped access covers each having vertically extending marginal flange portions respectively telescoped over said partition member parallel flange portions, said access covers extending from said ground line covers to said cap member to form a pair of vertically extending compartments fully enclosed above said ground line.

5. A dual use enclosure comprising a supporting stake member having a lower portion imbedded in the ground; a pair of vertically spaced support brackets; retaining means securing said brackets to said stake member; a lower enclosure portion extending from above said ground line to a location below said ground line including a pair of channel-shaped ground line cover members with edge surfaces of the flange portions thereof in abutting relation to form a wall surrounding said supporting stake, said pair of ground line cover members being secured to said support brackets; a vertically extending barrier wall within said enclosure and dividing said enclosure into two vertically extending compartments, said barrier wall being retained by being held captive by said retaining means between said brackets and said stake member; a cap member supported at the top of said barrier wall and vertically spaced above said ground line covers, said barrier wall having a pair of parallel marginal flanges extending between said ground line cover members and said cap member; and a pair of channel-shaped access covers having flange edge surfaces thereof in mutual confronting relation, said access covers having wall portions telescoped over said barrier wall marginal flanges and said lower enclosure portion and beneath said cap member.

6. A joint use terminal pedestal comprising a stake member having the lower end thereof imbedded in the ground; a lower enclosure portion including a wall surrounding said stake with the lower end imbedded in the ground to a lesser depth than said stake and the upper end terminating above the ground line; a vertically extending barrier wall member dividing said enclosure into two compartments; a pair of bracket members secured to said lower enclosure portion; connecting means securing said brackets to said stake member with said barrier member held captive therebetween; a cap member having vertical marginal wall portions and vertically spaced above said lower enclosure portion; said barrier member presenting parallel vertical flange portions extending from said lower enclosure portion to said cap member; a pair of selectively removable, generally U-shaped access covers with confronting flange edge surfaces, said access covers being telescoped beneath said cap member flanges and over said lower enclosure portion and barrier wall parallel flange portions to form an uninterrupted enclosure wall above the ground line.

7. A terminal enclosure for underground wiring systems comprising a stake member having the lower end thereof embedded in the ground; a lower enclosure portion including first wall means surrounding said stake with the lower end extending into the ground a lesser distance than said stake and the upper end terminating above the ground line; second wall means forming an upper enclosure portion cooperating with said lower enclosure portion to form an uninterrupted enclosure above the ground line; a vertically extending barrier wall member dividing said enclosure into two compartments; a pair of bracket members secured to said enclosure; and connecting means securing said bracket to said stake member, said upper enclosure portion including a pair of selectively removable generally U-shaped access covers respectively providing access to said two compartments, said access covers having the marginal edge portions in telescoping relation to the adjoining wall portions when in the assembled condition.

References Cited
UNITED STATES PATENTS

| | | | |
|---|---|---|---|
| 1,224,966 | 5/1917 | Schweitzer | 174—44 |
| 1,878,799 | 9/1932 | Ne Page | 52—221 X |
| 1,906,508 | 5/1933 | Arbogast | 52—28 X |
| 2,511,440 | 6/1950 | Long | 240—25 X |
| 3,242,252 | 3/1966 | Bergenstein | 174—38 |
| 3,268,651 | 8/1966 | Stevenson | 174—38 |

FOREIGN PATENTS

| | | |
|---|---|---|
| 1,359,838 | 3/1964 | France. |

FRANK L. ABBOTT, *Primary Examiner.*

C. G. MUELLER, *Assistant Examiner.*